(12) United States Patent
Oohara et al.

(10) Patent No.: US 9,592,481 B2
(45) Date of Patent: Mar. 14, 2017

(54) METHOD OF PRODUCING A GAS MIXING DEVICE

(71) Applicants: JGC CORPORATION, Tokyo (JP); OSAKA GAS CO., LTD., Osaka (JP)

(72) Inventors: Takeshi Oohara, Ibaraki (JP); Shuichi Oguro, Ibaraki (JP); Yoshiyuki Watanabe, Kanagawa (JP)

(73) Assignees: JGC CORPORATION, Tokyo (JP); OSAKA GAS CO., LTD., Osaka (JP)

( * ) Notice: Subject to any disclaimer, the term of this patent is extended or adjusted under 35 U.S.C. 154(b) by 142 days.

(21) Appl. No.: 14/277,420

(22) Filed: May 14, 2014

(65) Prior Publication Data

US 2014/0325819 A1 Nov. 6, 2014

Related U.S. Application Data

(62) Division of application No. 12/451,719, filed as application No. PCT/JP2008/063937 on Jul. 29, 2008, now abandoned.

(30) Foreign Application Priority Data

Jul. 30, 2007 (JP) ................................. 2007-196848

(51) Int. Cl.
  *B01F 5/00* (2006.01)
  *B01F 3/02* (2006.01)
  (Continued)

(52) U.S. Cl.
  CPC .............. *B01F 5/0696* (2013.01); *B01F 3/02* (2013.01); *B01F 5/0606* (2013.01); *B01J 8/025* (2013.01);
  (Continued)

(58) Field of Classification Search
  CPC .............. C01B 3/386; C01B 2203/025; C01B 2203/1282; B01F 5/0696
  (Continued)

(56) References Cited

U.S. PATENT DOCUMENTS 3,925,024 A * 12/1975 Hollingsworth et al. .... 422/143
5,002,481 A   3/1991 Forster
(Continued)

FOREIGN PATENT DOCUMENTS

EP   1 905 736   4/2008
JP   1-281139   11/1989
(Continued)

OTHER PUBLICATIONS

Resolution of Gas Phase and Surface Combustion Chemistry into Elementary Reactions Juergen Warnatz Twenty-fourth Symposium (International) on Combustion/The Combustion Institute, 1992/ pp. 553-570.
(Continued)

*Primary Examiner* — Matthew Merkling
(74) *Attorney, Agent, or Firm* — Jordan and Koda, PLLC

(57) ABSTRACT

A gas mixing device capable of safely mixing flammable gas containing, for example, methane or the like and combustion supporting gas such as oxygen-containing gas, and a synthesis gas producing device using this gas mixing device. Flammable gas containing methane or the like and combustion supporting gas such as oxygen-containing gas are supplied into a mixing vessel via a first gas supplying section and a second gas supplying section respectively, and these gases are mixed within a combustion range in the vessel to be discharged via a discharge section. In the mixing vessel, packings for forming a large number of narrow gas flow passages in the vessel are packed so that velocity of the mixed gas flowing in the vessel becomes higher than burn- (Continued)

ing velocity of the flammable gas and the combustion supporting gas.

9 Claims, 8 Drawing Sheets

(51) Int. Cl.
  *B01F 5/06* (2006.01)
  *B01J 8/02* (2006.01)
(52) U.S. Cl.
  CPC .... *B01J 8/0278* (2013.01); *B01J 2208/00902* (2013.01); *B01J 2208/00929* (2013.01); *B01J 2208/00938* (2013.01); *Y10T 29/49826* (2015.01)
(58) Field of Classification Search
  USPC ............................................................. 48/61
  See application file for complete search history.

(56) References Cited

U.S. PATENT DOCUMENTS

| | | | |
|---|---|---|---|
| 5,037,619 A | | 8/1991 | Alagy et al. |
| 5,935,489 A | | 8/1999 | Hershkowitz et al. |
| 5,980,596 A | | 11/1999 | Hershkowitz et al. |
| 6,444,179 B1 | | 9/2002 | Sederquist |
| 2002/0132942 A1* | | 9/2002 | Roggeman .......... B01F 3/04078 526/93 |
| 2003/0072700 A1 | | 4/2003 | Goebel et al. |
| 2005/0095186 A1 | | 5/2005 | McGee |
| 2007/0166211 A1* | | 7/2007 | Muschelknautz et al. ... 422/211 |
| 2009/0212259 A1 | | 8/2009 | Noguchi et al. |

FOREIGN PATENT DOCUMENTS

| | | |
|---|---|---|
| JP | 10-106606 | 4/1998 |
| JP | 2002-508733 | 3/2002 |
| JP | 2003-201103 | 7/2003 |
| JP | 2003-302012 | 10/2003 |
| JP | 2005-249240 | 9/2005 |
| JP | 3722775 | 11/2005 |
| JP | 2006-044977 | 2/2006 |
| JP | 2006-44977 | 2/2006 |
| JP | 2006-076850 | 3/2006 |
| JP | 2008-214164 | 9/2008 |
| SU | 1711659 | 2/1992 |
| WO | WO-2006/134887 | 12/2006 |

OTHER PUBLICATIONS

Publication 3: "Nesho Gairon" (Introduction to Combustion), revised version 1, Corona Publishing Co., Ltd., Oct. 20, 1982, pp. 66-68.

Examination Report from GCC Patent Office (State Intellectual Property Office of the P.R. China) dated Jan. 11, 2012.

* cited by examiner $$S_T = f(d, \frac{[O_2]}{[CH_4]}, T, P)$$
$$u > S_T$$

Fig. 6A DIFFUSIVE MIXING AREA
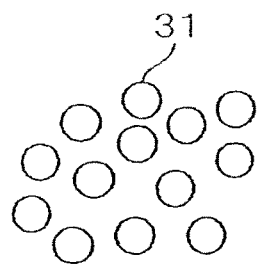
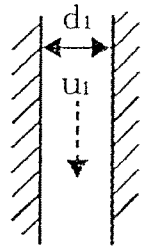
$u_1 > S_{TDMAX}$
Fig. 6B PREMIXING AREA
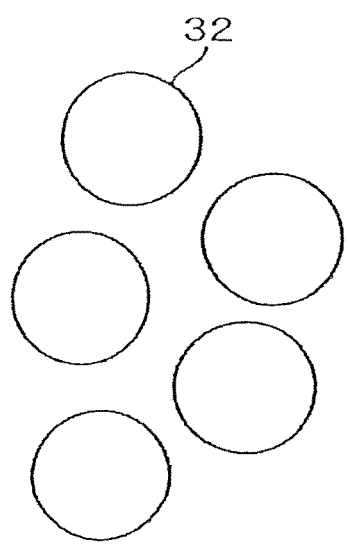
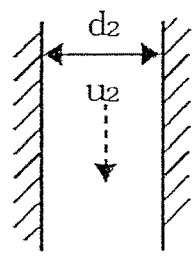
$u_2 > S_{TP}$
Fig. 6C DISCHARGE AREA
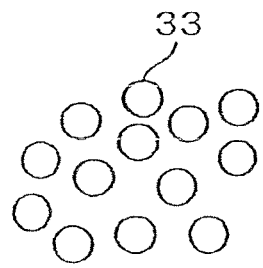
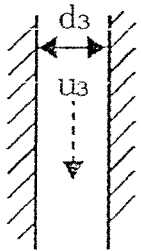
$u_3 > S_{Tout}$

METHOD OF PRODUCING A GAS MIXING DEVICE

This is a Divisional application of U.S. Ser. No. 12/451,719 filed Jan. 28, 2010.

TECHNICAL FIELD

The present invention relates to a gas mixing device mixing flammable gas containing, for example, methane or the like and combustion supporting gas such as oxygen-containing gas, and a synthesis gas producing device using the gas mixing device.

BACKGROUND OF THE INVENTION

In recent years, the global environmental problem and the problem of future depletion of petroleum resources ascribable to mass consumption of fossil fuel such as petroleum and coal have been controversial issues, and accordingly GTL (hydrocarbon liquid fuel) and DME (dimethyl ether) which are clean fuels produced from natural gas and the like have been drawing attention. Source gas for producing GTL and DME is called synthesis gas and contains carbon monoxide and hydrogen.

As a method of producing such synthesis gas, there have been conventionally known a steam reforming method (SMR) reforming natural gas or the like by steam, a partial oxidization method (PDX) using oxygen in the absence of a catalyst, an autothermal reforming method (ATR method) causing an oxidation reaction using an oxygen burner and a steam reforming reaction in the same reactor, and the like. The present applicant has developed a new synthesis gas production process adopting a catalytic partial oxidation method (CPO method) which uses a device with a simpler structure and in which problems of the generation of soot, carbon precipitation, and the like during the reaction are reduced, compared with the above conventional methods.

The CPO method is a method for generating synthesis gas by bringing oxygen-containing gas into contact with hydrocarbon gas, which is separated from natural gas or the like, in the presence of a catalyst to partially oxidize the hydrocarbon gas. In this CPO method, it is necessary to supply a catalyst layer with the hydrocarbon gas and the oxygen-containing gas which have been fully mixed in a mixing vessel and are not in a combustion state. However, mixed gas in a premixture state in which these gases have been fully mixed is within a combustion range, and even in the mixed gas in a diffusive mixture state where these gases are not fully mixed, areas within the combustion range dispersedly exist, and therefore, there is a risk that an abrupt combustion reaction may occur during or after the mixing of the gases, due to the supply of ignition energy originating from, for example, pipe friction, backfire from the catalyst layer, or the like. Under such circumstances, it has been an important issue to develop a safe gas mixing device capable of suppressing the progress of such combustion reaction even if the combustion reaction occurs.

A patent document 1 describes a gas combustion device for gas-fueled boiler in which a packing layer of ceramic balls is disposed at an outlet of a gas mixing chamber which mixes fuel gas and air to produce premixed gas. In this art, owing to the disposition of the packing layer, gas flow passages in which the premixed gas passes are narrowed, whereby the premixed gas is supplied into a combustion chamber at higher velocity than turbulent burning velocity of the premixed gas and thus the backfire from the combustion chamber toward the gas mixing chamber is prevented. Though describing the art for preventing the backfire at the outlet from the gas mixing chamber, the patent document 1 gives no description of a problem of a combustion reaction in the mixing chamber. Further, a patent document 2 describes a mixture accelerating means for mixing a hydrogen producing raw material such as kerosene with steam in order to produce hydrogen-containing reformed gas in the presence of a reforming catalyst, but does not mention at all a problem of the combustion of the mixed substances.

Patent Document 1
    Japanese Patent Application Laid-open No. 2005-249240: paragraph 0021 to paragraph 0022

Patent Document 2
    Japanese Patent Application Laid-open No. 2006-76850: paragraph 0027

SUMMARY OF THE INVENTION

The present invention was made under such circumstances, and its object is to provide a gas mixing device capable of safely mixing flammable gas containing, for example, methane or the like and combustion supporting gas such as oxygen-containing gas, and a synthesis gas producing device using the gas mixing device.

A gas mixing device according to the present invention includes: a first gas supplying section via which flammable gas is supplied;

a second gas supplying section via which combustion supporting gas is supplied;

a mixing vessel mixing the flammable gas supplied via the first gas supplying section and the combustion supporting gas supplied via the second gas supplying section, within a combustion range of the gases;

a discharge section via which mixed gas of the flammable gas and the combustion supporting gas is discharged from the mixing vessel, and packings which are packed in the mixing vessel and which form a large number of narrow gas flow passages in the mixing vessel so as to make velocity of the gas flowing in the mixing vessel higher than burning velocity of the flammable gas and the combustion supporting gas.

Here, the gas mixing device is suitable when the combustion supporting gas supplied to the device is oxygen-containing gas, the flammable gas contains methane as a major component, and the mixed gas of these gases is used to produce synthesis gas containing hydrogen and carbon monoxide as major components by partially oxidizing the methane by the oxygen in the presence of a catalyst.

Preferably, the packings are packed up to an upstream side of supply ports of the first supplying section and the second supplying section, and in particular, it is preferable that in a diffusive mixing area which is an area near the supply ports of the first gas supplying section and the second gas supplying section, by adjusting size of the packings, an average diameter of the large number of narrow gas flow passages is set so as to make velocity of the gas flowing in the diffusive mixing area higher than burning velocity of the flammable gas and the combustion supporting gas in the diffusive mixing area. On the other hand, preferably, in an area on a downstream side of the diffusive mixing area, by adjusting size of the packings, an average diameter of the large number of narrow gas flow passages in the downstream area is set so as to make velocity of the gas flowing in the downstream area higher than burning velocity of the flammable gas and the combustion supporting gas in a homogeneous mixture state.

Further, preferably, in the discharge section, the packings are packed so as to make velocity of the mixed gas flowing in the discharge section higher than burning velocity of the mixed gas at process temperature of a downstream process where the mixed gas is processed. Here, preferably, ceramic balls are adopted as the aforesaid packings. Besides, preferably, the first gas supplying section and the second gas supplying section are connected to the mixing vessel in a double tube state in which one of the gas supplying sections is an outer tube and the other is an inner tube. Preferably, a baffle member promoting homogeneous mixture of the flammable gas and the combustion supporting gas is provided in the mixing vessel.

Next, a synthesis gas producing device according to the present invention includes: any one of the above-described gas mixing devices in which flammable gas containing methane as a major component is supplied to the first gas supplying section and oxygen-containing gas is supplied to the second gas supplying section;

a gas processing section provided on a downstream side of the gas mixing device and having a catalyst layer which produces synthesis gas containing hydrogen and carbon monoxide as major components by partially oxidizing the methane by the oxygen; and a discharge nozzle via which the synthesis gas is discharged from the gas processing section.

The gas mixing device according to the present invention includes the packings packed in the mixing vessel, and therefore, when the flammable gas containing, for example, methane or the like and the combustion supporting gas such as oxygen-containing gas are mixed in the mixing vessel, the velocity of the mixed gas flowing in the narrow gas flow passages formed in gaps between these packings becomes higher than the burning velocity of the mixed gas. As a result, even if a combustion reaction occurs during the mixing of these gases, the spread of the combustion reaction in the whole mixing vessel can be suppressed, which makes it possible to prevent the device from being damaged by the combustion during the mixing of the gases, enabling improvement in safety of the device.

BRIEF DESCRIPTION OF THE DRAWINGS

FIG. 6A is an explanatory view showing the relation between average velocity and burning velocity of the mixed gas flowing in the diffusive area in the gas mixing device;

FIG. 6B is an explanatory view showing the relation between average velocity and burning velocity of the mixed gas flowing in the premixing area in the gas mixing device;

FIG. 6C is an explanatory view showing the relation between average velocity and burning velocity of the mixed gas flowing in the discharge area in the gas mixing device;

DETAILED DESCRIPTION OF THE PREFERRED EMBODIMENTS

Figure 1:
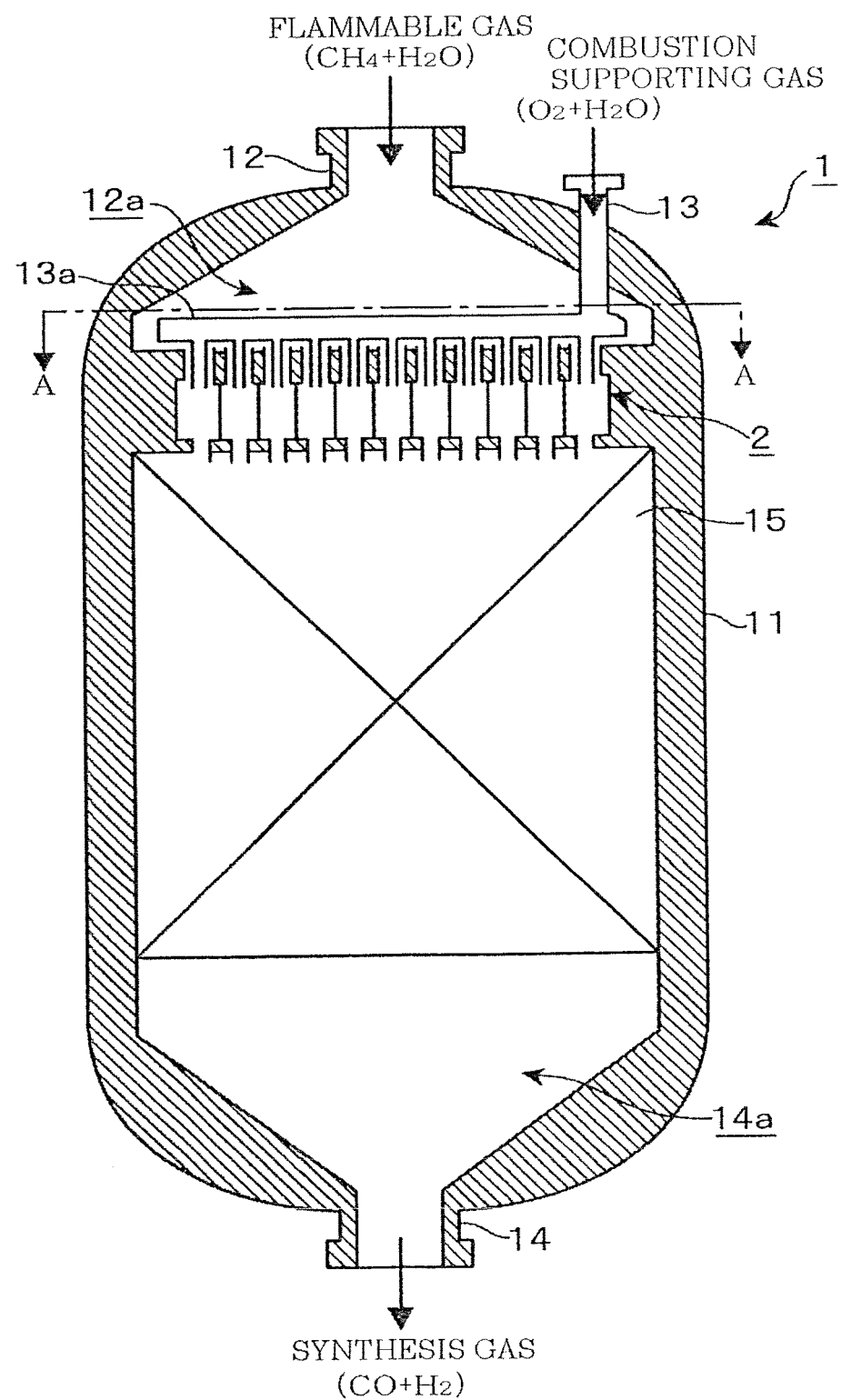
FIG. 1 is a cross-sectional view of a synthesis gas producing device in which a gas mixing device according to an embodiment of the present invention is employed.

Hereinafter, an embodiment where a gas mixing device according to the present invention is employed in a synthesis gas producing device which partially oxidizes flammable gas containing methane by combustion supporting gas which is oxygen-containing gas, thereby producing synthesis gas containing hydrogen and carbon monoxide as its major components. FIG. 1 is a vertical cross-sectional view schematically showing a synthesis gas producing device 1 according to the embodiment, and FIG. 2 is a horizontal cross-sectional view seen in the A-A arrow direction.

As shown in FIG. 1, the synthesis gas producing device 1 is formed by a cylindrical reactor 11, and in an upper portion of the reactor 11, provided are a flammable gas lead-in nozzle 12 and a combustion supporting gas lead-in nozzle 13 via which flammable gas and combustion supporting gas are supplied respectively. Under the nozzles 12, 13 in the reactor 11, a group of gas mixing devices 2 according to this embodiment and a catalyst layer 15 where a partial oxidation reaction of methane progresses are provided in this order, and a synthesis gas discharge nozzle 14 via which the synthesis gas produced in the catalyst layer 15 is discharged is provided in a lower end of the reactor 11, The flammable gas lead-in nozzle 12 is provided in, for example, a tower top of the reactor 11 and plays a role of receiving the flammable gas from a not-shown supply pipe to lead the flammable gas into the reactor 11. In a downstream portion of the flammable gas lead-in nozzle 12, a gas lead-in chamber 12a in a truncated cone shape is provided, and as shown in FIG. 2, on a circular floor of the gas lead-in chamber 12a, a group of the gas mixing devices 2 is provided, the group consisting of a plurality of parallel rows each including the plural gas mixing devices 2. Each of these large number of gas mixing devices 2 has a vertically long cylinder 20 forming an armor as will be described later, and an upper end of the cylinder 20 is open toward the gas lead-in chamber 12a.

In an upper surface of the reactor 11, the combustion supporting gas lead-in nozzle 13 is provided at a position deviated from the tower top and it plays a role of receiving the combustion supporting gas from a not-shown supply pipe. As shown in FIG. 1 and FIG. 2, in the aforesaid gas lead-in chamber 12a, a distributor 13a is provided to distribute the combustion supporting gas to the gas mixing devices 2, and the combustion supporting gas lead-in nozzle 13 is coupled to the distributor 13a.

Figure 2:
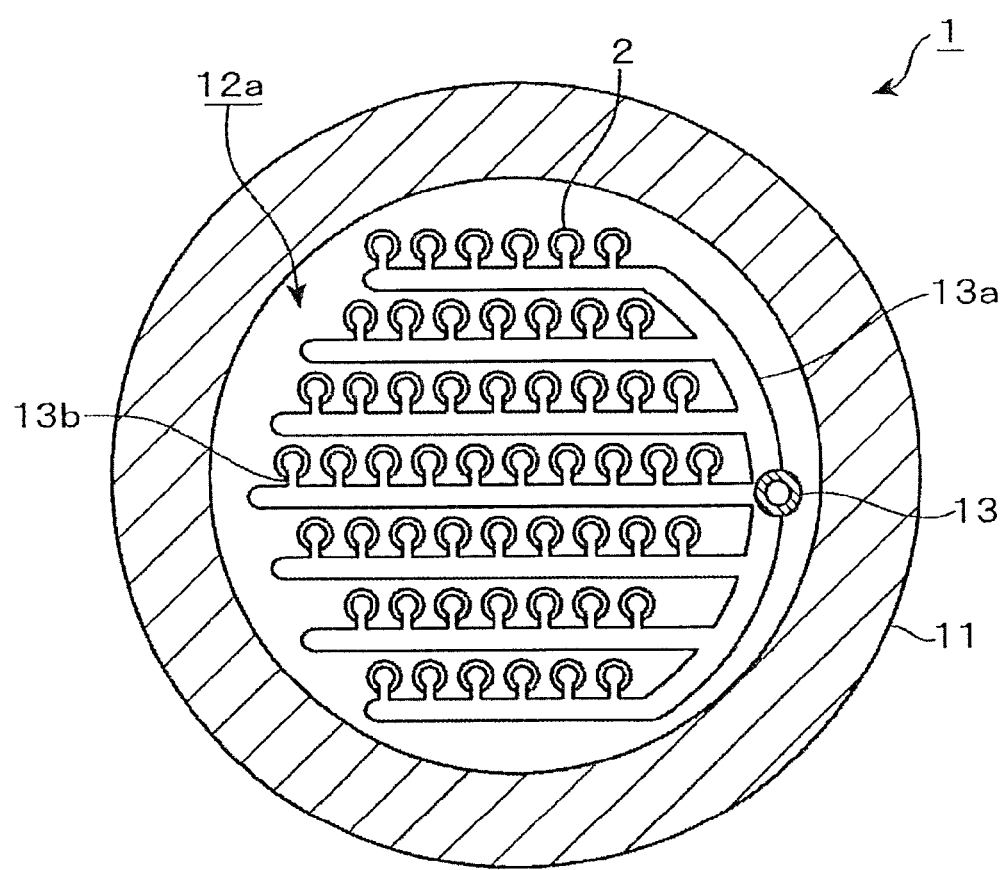
FIG. 2 is a horizontal cross-sectional view of the vicinity of a tower top of the synthesis gas producing device.
Figure 3:
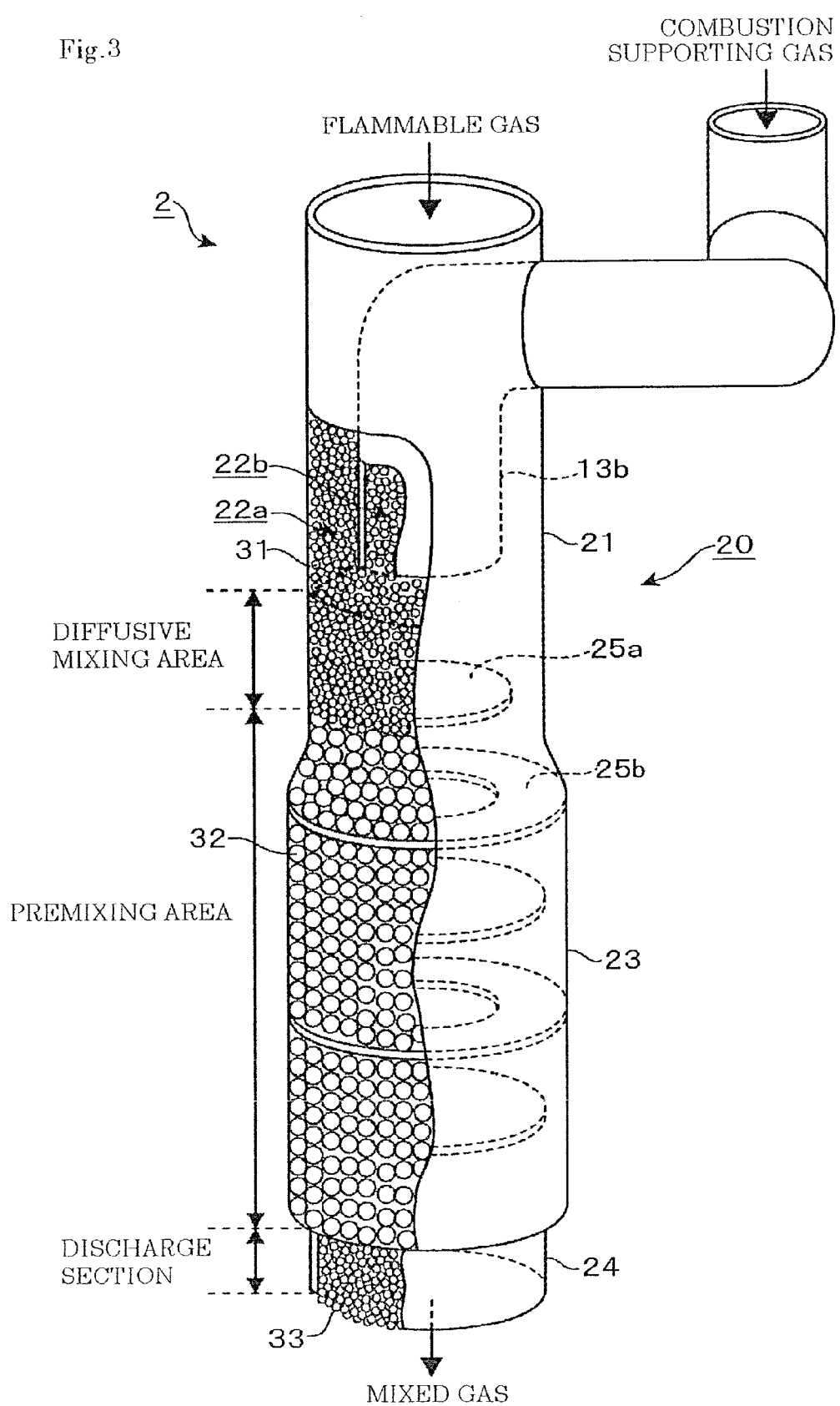
FIG. 3 is a perspective view showing the structure of the gas mixing device.

As shown in FIG. 2, the distributor 13a has a comb-like branching structure, and a large number of distribution tubes 13b are coupled to its branches. As shown in FIG. 3, each of the distribution tubes 13b penetrates through a sidewall of an upper end portion of the cylinder 20 of the gas mixing device 2, and its tip portion bends in an inverted L-shape to extend downward and is open so as to supply the combustion supporting gas toward an area thereunder in the cylinder 20. Therefore, an area corresponding to the upper end portion of the cylinder 20 has a double-tube structure made up of the wall of the cylinder 20 and the distribution tube 13b of the distributor 13a.

Here, a ring-shaped space between the wall of the cylinder 20 and the distribution tube 13b corresponds to a first gas supplying section 22a via which the flammable gas from the gas lead-in chamber 12a is supplied to a mixing space in the cylinder 20, and the tip portion of the distribution tube 13b corresponds to a second gas supplying section 22b via which the combustion supporting gas from the distributor 13a is supplied to the mixing space. Further, the reactor 11 is structured so as not to allow the flammable gas from the gas lead-in chamber 12a to pass through places other than the gas mixing devices 2, so that the flammable gas and the combustion supporting gas are surely mixed in the gas mixing devices 2 to be supplied to the catalyst layer 15.

The flammable gas is natural gas containing methane as its major component, and the combustion supporting gas is oxygen-containing gas containing 80% oxygen or more, for instance, and is supplied so that a mole ratio of oxygen to methane supplied by the flammable gas ($[O_2]/[CH_4]$) falls within, for example, a range from 0.2 to 0.8, for example, 0.6. Further, the combustion supporting gas also contains steam, and is supplied so that a mole ratio of the steam to methane supplied from the flammable gas ($[H_2O]/[CH_4]$) falls within, for example, a range from 0.2 to 0.8, for example, 0.6.

The catalyst layer 15 serves as a gas processing section which is provided on a downstream side of the gas mixing devices 2 to process mixed gas produced in the gas mixing devices 2. The catalyst layer 15 is loaded with catalysts which are baked in, for example, a pellet form and in each of which metal such as platinum is dispersedly carried on an alumina surface, and these catalysts are supported by a not-shown support member. In the catalyst layer 15, gas processing is performed in which, for example, a total oxidation reaction represented by the following formula (1), a steam reforming reaction represented by the formula (2), and a reverse shift reaction represented by the formula (3) progress simultaneously to produce the synthesis gas.

$$CH_4 + 2O_2 \rightarrow CO_2 + 2H_2O \quad (1)$$

$$CH_4 + H_2O \rightarrow CO + 3H_2 \quad (2)$$

$$CO_2 + H_2O \rightarrow CO + H_2 \quad (3)$$

The synthesis gas discharge nozzle 14 plays a role of discharging, from the reactor 11, the synthesis gas synthesized in the catalyst layer 15 and thereafter collected in a gas discharge chamber 14a on a subsequent stage.

The synthesis gas producing device 1 has the structure described above, and the catalyst layer 15 producing the synthesis gas is supplied with the mixed gas of the homogenously mixed flammable gas and combustion supporting gas. However, when the flammable gas containing methane gas as its major component and the combustion supporting gas containing oxygen as its major component are mixed, there is a risk that a combustion reaction may occur before they are supplied to the catalyst layer 15. Therefore, the large number of gas mixing devices 2 provided in the synthesis gas producing device 1 according to this embodiment have not only a function of homogenously mixing these gases but also a function of suppressing the progress of the combustion reaction even if the combustion reaction occurs during the mixing of the gases. Hereinafter, the structure of the gas mixing device 2 according to this embodiment and the principle for suppressing the progress of the combustion reaction will be described with reference to FIG. 3 to FIG. 5.

The gas mixing devices 2 have substantially the same structure, and are structured as shown in the perspective view in FIG. 3, for instance. In the gas mixing device 2, the cylinder 20 forming its armor serves as a mixing vessel mixing the flammable gas supplied via the aforesaid first gas supplying section 22a and the combustion supporting gas supplied via the second gas supplying section 22b within a combustion range of these gases. The cylinder 20 includes: a first cylindrical portion 21 which is a portion up to a position, for example, several centimeters downwardly distant from a lower end of the first gas supplying section 22a (second gas supplying section 22b) and has a first bore; a second cylindrical portion 23 which is positioned under the first cylindrical portion 21 and has a second bore larger than the first bore; and a third cylindrical portion 24 which is positioned under the second cylindrical portion 23 and has a third bore smaller than the first bore. Concretely, for example, the cylinder 20 has a height of about several tens cm to hundred and several tens cm. In these cylindrical portions 21, 23, 24, ceramic balls 31 to 33 different in size depending on their positions are packed.

The first cylindrical portion 21 is a cylinder having, for example, a height slightly smaller than half the total height of the gas mixing device 2 and a diameter of about several cm to several tens cm. In the first cylindrical portion 21, a downstream area near the first gas supplying section 22a and the second gas supplying section 22b is a diffusive mixing area where the flammable gas and the combustion supporting gas supplied via the supplying sections 22a, 22b respectively are diffusively mixed. In the diffusive mixing area, ceramic balls 31 having, for example, a diameter of about several mm to several tens mm, for example, 10 mm are packed. The ceramic balls 31 play a role of suppressing the progress of a combustion reaction if the reaction occurs during the mixing of the flammable gas and the combustion supporting gas. Further, a several cm area on the upstream side of the supply ports of the first gas supplying section 22a and the second gas supplying section 22b is also loaded with the same ceramic balls 31 as those described above.

The second cylindrical portion 23 corresponds to a pre-mixing area where the mixture state of the flammable gas and the combustion supporting gas diffusively mixed in the first cylindrical portion 21 is improved to a more homogeneous mixture state (premixture state). For example, the second cylindrical portion 23 has a height substantially equal to the height of the aforesaid first cylindrical portion 21, and ceramic balls 32 having, for example, a diameter of several mm to several tens mm, for example, 20 mm are packed therein. The ceramic balls 32 play a role of suppressing the progress of a combustion reaction if the reaction occurs in the mixed gas.

Further, in the cylinder 20, in an area from a lower end of the first cylindrical portion 21 to a lower end of the second cylindrical portion 23, a plurality of baffle members 25a, 25b are installed in parallel to one another at substantially equal intervals in an axial direction of the cylinder 20, as shown by the broken lines in FIG. 3. The baffle members 25a, 25b play a role of restricting a flow passage of the mixed gas flowing in the lower end of the first cylindrical portion 21 and in the second cylindrical portion 23 to greatly change the flow direction of the mixed gas or to disturb the flow, thereby bringing the mixed gas into a more homogenous mixture state. As the baffle members 25a, 25b, disk-shaped ones 25a and annular ones 25b are alternately arranged, and the mixed gas passes through spaces formed between the disk baffle members 25a and the second cylindrical portion 23 and through spaces in the annular rings of the annular baffle members 25b alternately. The aforesaid ceramic balls 32 are packed so as to fill spaces formed between the baffle members 25a, 25b.

The third cylindrical portion 24 corresponds to a discharge section of the mixed gas, and this discharge section plays a role of not only discharging the mixed gas, which is in the premixture state with the uniform concentration after passing through the gas mixing device 2, to the catalyst layer 15 on a subsequent stage, but also preventing so-called backfire from the catalyst layer 15 to the upstream side. The third cylindrical portion 24 has a height of about several cm to ten odds cm, and ceramic balls 33 having, for example, a diameter of about several mm to about ten odds mm, for example, 10 mm are packed therein. The ceramic balls 33 function to suppress the progress of a combustion reaction occurring in the discharge section and prevent backfire from the catalyst layer 15 side whose temperature has become high due to reaction heat of the partial oxidation reaction. Incidentally, on a lower end of the third cylindrical portion 24 opening toward the catalyst layer 15, a not-shown heat-resistant net whose mesh is finer than that of the ceramic balls 33 is disposed, for instance, to prevent the ceramic balls 33 from falling down to the catalyst layer 15.

As described above, in the cylindrical portions 21, 23, 24 forming the gas mixing device 2, the ceramic balls 31 to 33 different in size depending on their loading positions are packed, and the progress of the combustion reactions occurring in the gas mixing device 2 is suppressed owing to the loading of these ceramic balls 31, 33. Hereinafter, the operation of suppressing the progress of the combustion reactions by the packing layers of the ceramic balls 31, 33 will be described with reference to FIGS. 4A, 4B and FIG. 5.

Figure 4A:
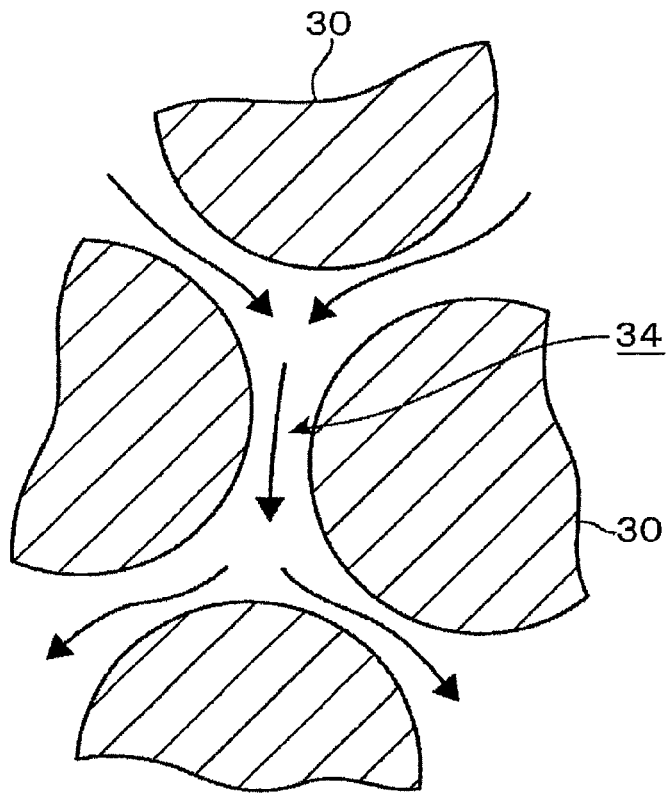
FIG. 4A is an explanatory view schematically showing a state of the flow of the mixed gas flowing in a packing layer of ceramic.
Figure 4B:
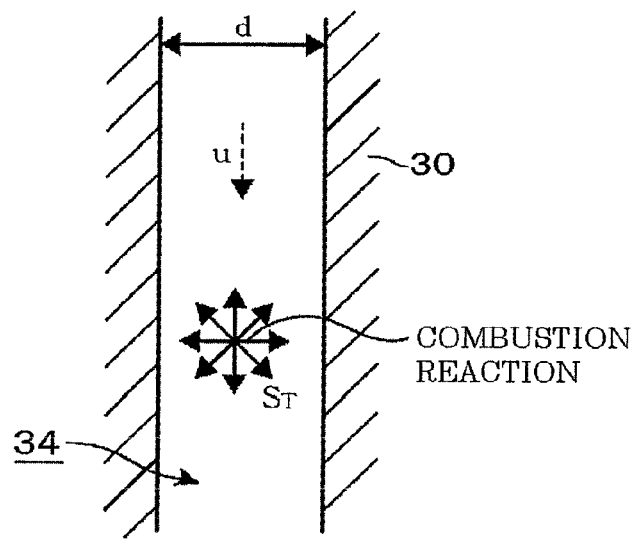
FIG. 4B is an explanatory view showing a model of a relation between the flow and burning velocity in this packing layer.

FIG. 4A is an explanatory view schematically showing a state of the flow of the mixed gas flowing in a packing layer of ceramic balls 30, and FIG. 4B is an explanatory view showing a model of a relation between the flow and burning velocity in this packing layer. The ceramic balls shown in FIGS. 4A, 4B comprehensively represent the ceramic balls 31 to 33 and are denoted by the reference numeral "30".

In the aforesaid cylindrical portions 21, 23, 24 loaded with the ceramic balls 30, numerous narrow gas flow passages 34 are formed in gaps between the ceramic balls 30, and as shown in FIG. 4A, the mixed gas passes through the gas flow passages 34 to flow downstream while repeating confluence and dispersion. Here, as shown in FIG. 4B as a model, an average diameter of the gas flow passages 34 formed in the gaps between the ceramic balls 30, in terms of, for example, a cylindrical tube diameter, is defined as "d", and average velocity of the mixed gas flowing in the gas flow passages 34 is defined as "u". A case will be studied where in the gas flow passages 34 under such conditions, ignition energy is supplied due to, for example, the friction or the like with the ceramic balls 30 to cause the combustion reaction whose burning velocity is "$S_T$".

When the combustion reaction occurs at a certain position in the gas flow passages 34, the reaction propagates spherically to the surroundings at the burning velocity "$S_T$" as shown in FIG. 4B. However, when the average velocity "u" of the mixed gas is higher than the burning velocity "$S_T$", the combustion reaction propagating toward an upstream side of the gas flow passage 34 is pushed back by the flow of the mixed gas and cannot spread to the upstream side. As for the combustion reaction propagating to a downstream side, the once ignited mixed gas is blown away to a downstream process when the average velocity "u" of the mixed gas is higher than the burning velocity "$S_T$". Further, since specific heat of the ceramic balls 30 is high, there occurs an operation that energy necessary for the propagation of the combustion is deprived of. Further, such an effect can be expected that, as for the combustion reaction propagating in the narrow gas flow passages 34, the propagation in the passage diameter direction is inhibited by a wall surface, that is, by the ceramic balls 30.

As descried above, in the gas flow passages 34 formed in the gaps between the ceramic balls 30, by making the average velocity "u" of the mixed gas flowing in the flow passages 34 higher than the burning velocity "$S_T$" of the combustion reaction occurring in the gas flow passages 34, it is possible to suppress the rapid progress of the combustion reaction which has once occurred. Therefore, in designing the gas mixing device 2 having such a function, it is important to know the burning velocity of the mixed gas.

In the model shown in FIG. 4B, the burning velocity "$S_T$" of the combustion reaction between the flammable gas and the combustion supporting gas can be expressed as a function of the average diameter "d" of the gas flow passages 34, a mole ratio of oxygen to methane in the mixed gas, temperature "T" of the mixed gas, and pressure "P" in the gas mixing device 2, as shown by the expression (4).

$$S_T = f(d, [O_2]/[CH_4], T, P) \quad (4)$$

Figure 5:
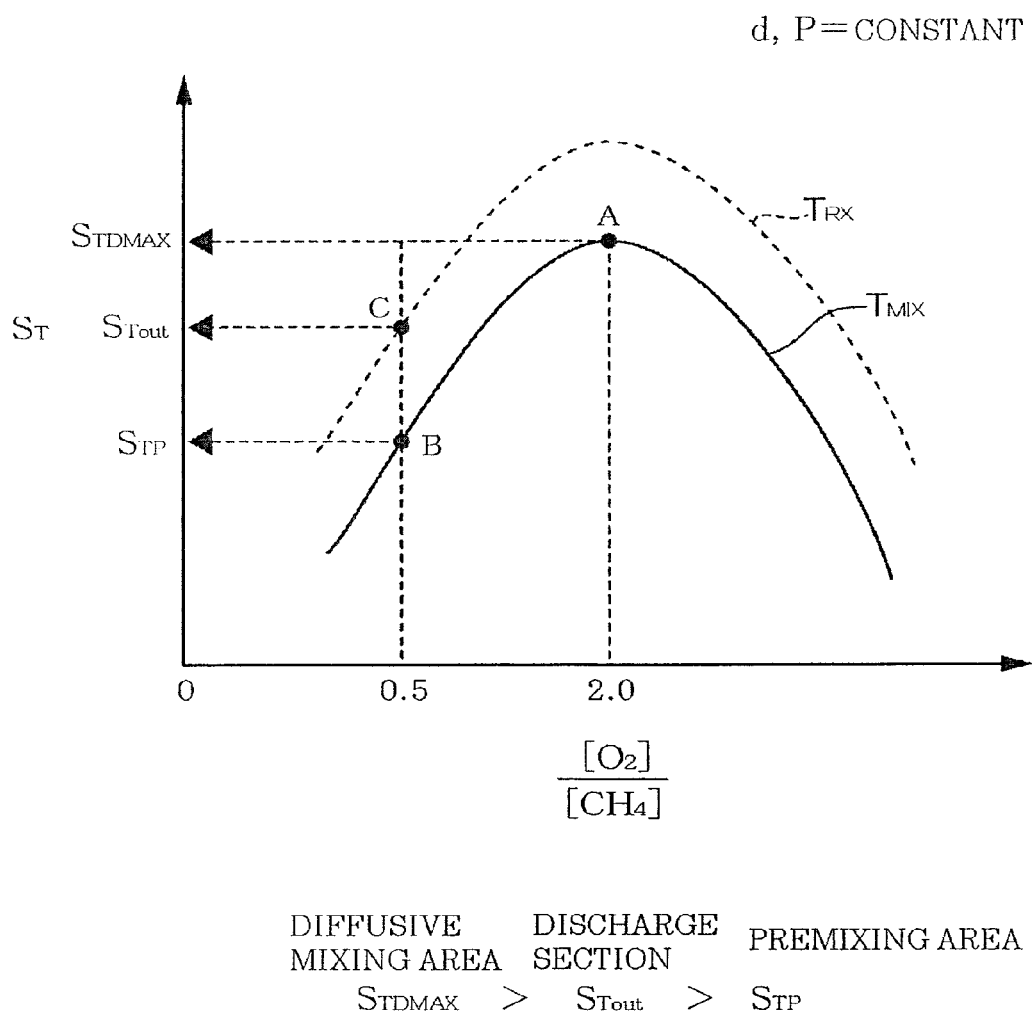
FIG. 5 is an explanatory chart showing the correlation between a mixture ratio and burning velocity of mixed gas produced in the gas mixing device.

FIG. 5 is a chart showing how the burning velocity changes depending on the mole ratio of oxygen and methane in the mixed gas, based on the principle in the expression (4). The solid line represents burning velocity at temperature "$T_{MIX}$" (for example, 200° C.) in the gas mixing device 2, and the broken line represents burning velocity at temperature "$T_{RX}$" (for example, 1,400° C.) of the catalyst layer 15. It is assumed that the average diameter "d" of the gas flow passages and the pressure "P" are constant.

The combustion reaction of methane and oxygen progresses based on the following formula (5), and the burning velocity is highest when they are mixed so that a mole ratio of their molecules can be expressed by stoichiometry shown in the formula (5).

$$CH_4 + 2O_2 \rightarrow CO_2 + 2H_2O \quad (5)$$

On the other hand, when the mole ratio deviates from the stoichiometry due to an increase in the concentration of one of oxygen and methane, the burning velocity decreases, so that the curve of the burning velocity vs. the mole ratio of the mixed gas becomes a convex curve. Further, as shown by the broken line in FIG. 5, when the temperature of the mixed gas increases, the burning velocity curve shifts in a direction toward an increase in the burning velocity, even under the same mole ratio.

The burning velocity of the mixed gas exhibits such a behavior according to the mixture state and the temperature of the mixed gas, and it will be studied with what burning velocity the combustion reaction can occur in the diffusive mixing area, the premixing area, and the discharge section shown in FIG. 3. First, in the diffusive mixing area, since this is an area where the combustion supporting gas is supplied from the distribution tube 13 to the flow of the flammable gas flowing in the first cylindrical portion 21 and the diffusive mixture of these gases progresses, mixture states with a wide range of mole ratios, for example, from zero to the infinite can coexist in the gas flow passages 34 in a microscopic view of the mixture state. Therefore, in a part with the mixture state represented by the above formula (5), the combustion reaction at burning velocity "$S_{TD}$" corresponding to the vertex (A point) of the solid line in FIG. 5 can occur.

On the other hand, in the premixing area, since the concentration of the mixed gas is substantially uniform and the mole ratio of oxygen to methane is 0.6 as described above, the combustion reaction at burning velocity "$S_{TP}$" at B point on the solid line in FIG. 5 occurs. Further, the discharge section is in contact with the catalyst layer 15 whose temperature atmosphere reaches no less than 1,400° C. and thus requires a structure capable of suppressing the combustion reaction even if the mixed gas at such a high temperature flows back. Therefore, this area needs to be designed on assumption that the combustion reaction at burning velocity "$S_{TOUT}$" at C point on the broken line in FIG. 5 can occur in this area. Hereinafter, each of the aforesaid values "$S_{TDMAX}$, $S_{TP}$, $S_{TOUT}$" will be called design burning velocity.

To summarize the above, among the design burning velocities in the areas in the gas mixing device 2, the design burning velocity "$S_{TDMAX}$" in the diffusive mixing area is the highest, and the design burning velocity decreases in order of "$S_{TOUT}$" in the discharge section and "$S_{TP}$" in the premixing area. The gas mixing device 2 is required to have capability to suppress the progress of the combustion reactions propagating at these design combustion velocities.

Here, the combustion velocities shown in FIG. 5 are those under the condition that the average diameter "d" of the gas flow passages 34 is constant, but it has been known that increasing the average diameter "d" of the passages also increases the burning velocity "$S_T$", and decreasing "d" also decreases "$S_T$". Further, since the gas flow passages 34 are flow passages formed in the gaps between the ceramic balls 30, as ceramic balls 30 with a smaller diameter and a larger curvature are used, the ceramic balls 30 can be more densely packed and the average diameter (d) of the gas flow passages 34 can be made smaller. From the above viewpoint, in the synthesis gas producing device 1 according to this embodiment, the ceramic balls 31, 33 small in diameter are adopted in the diffusive mixing area and the discharge section where the design burning velocities are high, thereby decreasing the design combustion velocities "$S_{TOUT}$, $S_{TDMAX}$" in the respective positions.

Incidentally, it is also conceivable to pack the small ceramic balls 33 in the whole gas mixing device 2, but this has a problem that pressure loss of the gas mixing device 2 becomes too large. Therefore, in the gas mixing device 2 according to this embodiment, the ceramic balls 32 with a relatively large diameter are used in the premixing area where the design burning velocity "$S_{TP}$" is relatively small, thereby reducing the pressure loss of the whole gas mixing device 2.

Along with such decision of the size of the ceramic balls 31 to 33 packed in the respective areas, the diameters of the cylindrical portions 21, 23, 24, the installation number of the gas mixing devices 2 in the synthesis gas producing device 1, and so on are decided so that the average velocities "$u_1$, $u_2$, $u_3$" of the mixed gas in the diffusive mixing area, the premixing area, and the discharge section become higher than the design combustion velocities "$S_{TDMAX}$, $S_{TP}$, $S_{TOUT}$" in the respective areas.

Further, when a volumetric flow rate of the mixed gas processed in one gas mixing device 2 is constant, it is possible to change the average velocity of the mixed gas flowing in the gas flow passages 34, not only by changing the size of the ceramic balls 30 as described above but also by changing, for example, superficial velocities of the mixed gas flowing in the cylindrical portions 21, 23, 22. For example, by making the diameters of the cylindrical portions 21, 23, 24 small, it is possible to make the average velocities high, but the diameter decrease results in an increased pressure loss. Therefore, in the gas mixing device 2 according to this embodiment, the diameter of the first cylindrical portion 21 as the diffusive mixing area and the diameter of the third cylindrical portion 24 as the discharge sections where the design combustion velocities are high are reduced to accordingly increase the superficial velocities of the mixed gas flowing in these areas, thereby increasing the values of "$u_1$, $u_3$", while in the premixing area where the design combustion velocity is not very high, the diameter of the second cylindrical portion 23 is made larger than those of the cylindrical portions 21, 24, thereby lowering the superficial velocities and suppressing an increase in pressure loss. For example, if there still is allowance for the pressure loss, the diameter of the second cylindrical portion 23 may be made equal to the diameter of either of the other cylindrical portions 21, 24.

In designing, it is preferable that the installation number of the gas mixing devices 2, the diameters of the first cylindrical portion 21, the second cylindrical portion 23, and so on, and the sizes of the ceramic balls 31 to 33 are decided based on, for example, the operation lower limit value and the like of the synthesis gas producing device 1 so that the aforesaid average velocities "$u_1$, $u_2$, $u_3$" of the mixed gas become higher than the design combustion velocities "$S_{TDMAX}$, $S_{TP}$, $S_{TOUT}$" in the respective areas, even if supply amounts of the flammable gas and the combustion supporting gas supplied to each of the gas mixing devices 2 becomes the lowest design flow rate. Further, if the average value of the gas velocities is adopted, the combustion reaction sometimes progresses in the area with a slow flow, and therefore, in designing, a value equal to the aforesaid average velocity multiplied by an appropriate safety factor (<1) (a lower velocity than the average velocity) may be made larger than the design burning velocity.

The gas mixing device 2 according to this embodiment is structured from the above viewpoint and can suppress the progress of the combustion reaction even if the combustion reaction occurs in the mixed gas. Hereinafter, the operation of the synthesis gas producing device 1 and the gas mixing device 2 according to the embodiment will be described.

Figure 7:
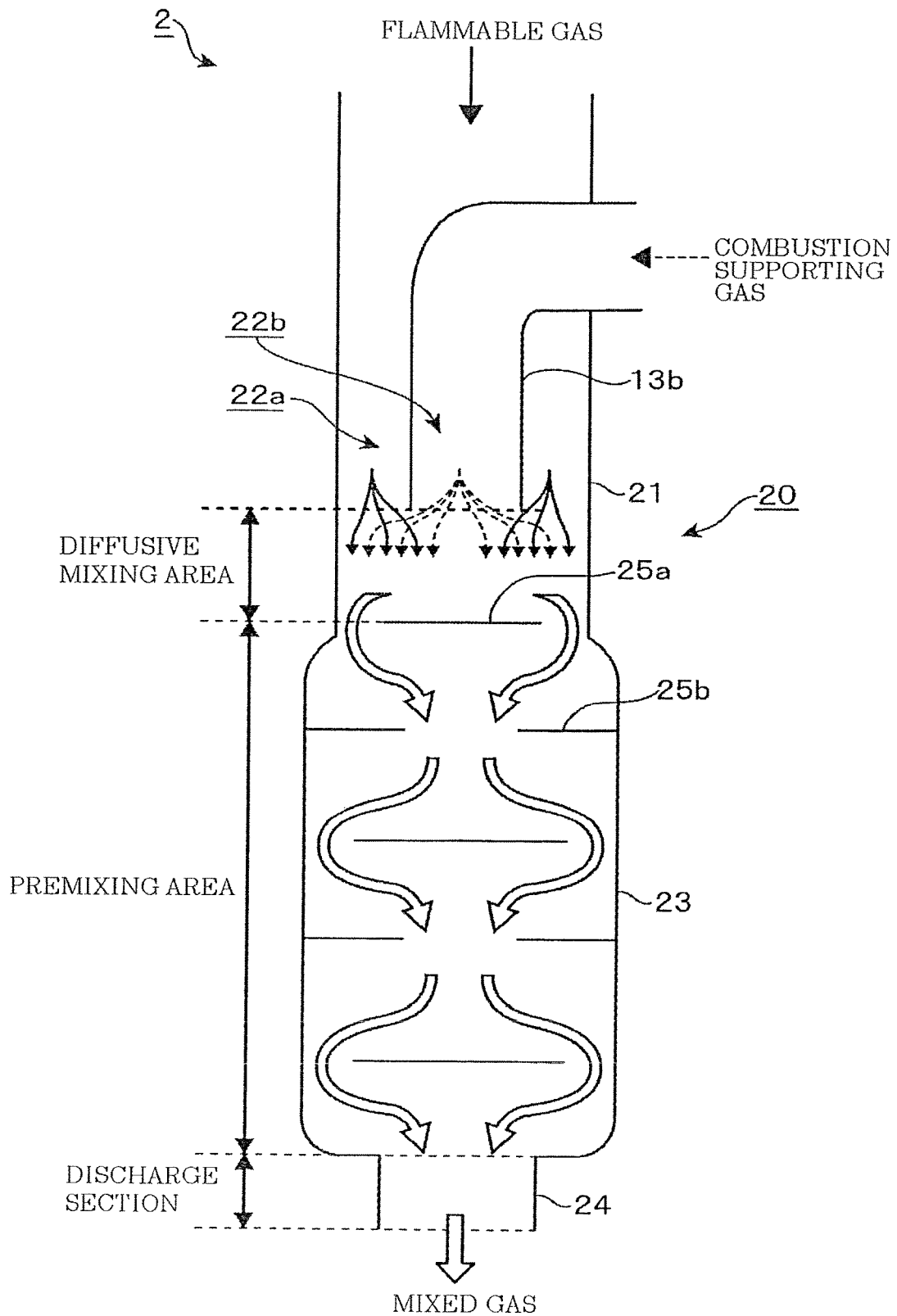
FIG. 7 is a vertical cross-sectional view used to describe the operation of the gas mixing device.

When the flammable gas containing methane as its major component is led into the synthesis gas producing device 1 via the flammable gas lead-in nozzle 12 from, for example, a gas reforming device on a preceding stage, the flammable gas diffuses in the gas lead-in chamber 12a shown in FIG. 1 and FIG. 2 to dispersedly flow into the first cylindrical portions 21 of the large number of the gas mixing devices 2 disposed on the downstream side of the gas lead-in chamber 12a. Meanwhile, the combustion supporting gas led via the combustion supporting gas lead-in nozzle 13 is distributed to the gas mixing devices 2 via the distributor 13 and the distribution tubes 13b. Then, as schematically shown in the vertical cross-sectional view in FIG. 7, the flammable gas and the combustion supporting gas join each other in the diffusive mixing area on the downstream side of the supply ports of the first gas supplying section 22a and the second gas supplying section 22b. In FIG. 7, the solid arrows represent the flammable gas, the broken arrows represent the combustion supporting gas, and the outline arrows represent the mixed gas.

Here, since the flammable gas and the combustion supporting gas are supplied in the same flow direction owing to the double-tube structure of the first cylindrical portion 21 and the distribution tube 13b, the pressure loss is smaller than that when, for example, these flows intersect with each other. Further, since there is a risk that metal combustion may occur due to a reaction of oxygen in the combustion supporting gas with metal that forms pipes of the combustion supporting gas lead-in nozzle 13 and the distribution tube 13b, the combustion supporting gas preferably flows in these pipes at velocity not causing such metal combustion.

The flammable gas and the combustion supporting gas joining in the diffusive mixing area pass through the numerous gas flow passages 34 formed by the ceramic balls 31 packed in the diffusive mixing area to be gradually turned into the homogeneous mixed gas while repeating the confluence and dispersion. Here, the velocity "$u_1$" of the mixed gas flowing in the gas flow passages 34 is higher than the highest possible burning velocity "$S_{TD}$" of the mixed gas in the diffusive mixture state, and therefore, even if the combustion reaction occurs in the gas flow passages 34, it is possible to suppress the rapid progress of the combustion reaction as described with reference to FIG. 4B and completely supply the gas to an upstream process. Further, the ceramic balls 31 are packed up to the portion, of the first cylindrical portion 21, on the upstream side of the diffusive mixing area and in the distribution tube 13, and therefore, even if part of the mixed gas flows back to the upstream side due to, for example, flow turbulence or the like and the combustion reaction occurs there, the progress of the reaction can be suppressed.

The mixed gas having gone through the diffusive mixing area is changed in its flow direction in a bulked manner by many stages of the baffle members 25a, 25b provided in the premixing area as shown in FIG. 7, and repeats the confluence and dispersion, so that the mixed gas becomes in a premixture state where variation in gas concentration is eliminated and thus the concentration is uniform. The temperature in the premixing area at this time is, for example, two hundred and several tens ° C. Further, as described with reference to FIG. 5, the burning velocity "$S_{TP}$" of the mixed gas in this state is lower than the aforesaid "$S_{TDMAX}$". Therefore, by setting the size of the ceramic balls 32 packed in this area and the diameter of the second cylindrical portion 23 to large values while keeping the state where the average velocity "$u_2$" of the mixed gas flowing in the gas flow passages 34 in this area is higher than the burning velocity "$S_{TP}$", it is possible not only to suppress the progress of the combustion reaction occurring in this area but also to suppress an increase in the pressure loss due to the loading of the ceramic balls 31 to 33 in the gas mixing devices 2.

The mixed gas in the uniform concentration mixture state after thus passing through the diffusive mixing area and the premixing area passes through the small-diameter third cylindrical portion 24 which is loaded with the small ceramic balls 33 similarly to the diffusive mixing area, so that the mixed gas passes through the gas flow passages 34 at the average velocity "$u_3$" higher than the burning velocity "$S_{TOUT}$" of the mixed gas at the temperature in the catalyst layer 15. As a result, it is possible to supply the mixed gas with the uniform concentration to the catalyst layer 15 while preventing the backfire from an upper layer portion of the catalyst layer 15 whose temperature reaches, for example, not lower than 1,400° C.

The mixed gas thus having passed through the large number of gas mixing devices 2, which are provided in the synthesis gas producing device 1, to have the uniform concentration is supplied into the catalyst layer 15. Then, in the catalyst layer 15, the partial oxidation reaction progresses as shown by the above formula (1), so that the synthesis gas is produced, which is then discharged through the synthesis gas discharge nozzle 14. Here, in the catalyst layer 15, most of the mixed gas reacts in an area near an entrance of the catalyst layer 15, and therefore, the temperature of this area is the highest, for example, 1,400° C., and the temperature on the downstream side of this area is, for example, 1,000° C. to 1,100° C.

The gas mixing device 2 according to this embodiment has the following effects. In the gas mixing device 2, the ceramic balls 31, 32 are packed in advance in the cylinder 20, and therefore, when the flammable gas containing, for example, methane and the combustion supporting gas such as oxygen-containing gas are mixed in the cylinder 20 as the mixing vessel, the average velocities of the mixed gas flowing in the narrow gas flow passages 34 formed in the gaps between the ceramic balls 31, 32 become higher than the burning velocities of the mixed gas. As a result, the spread of the combustion reaction in the whole mixing vessel can be prevented even if the combustion reaction is caused during the mixing of these gases, which makes it possible to prevent the gas mixing device 2 from being damaged by the combustion occurring during the mixing of the gases, realizing improved safety of the gas mixing device 2.

Further, in the above-described embodiment, between the burning velocity of the mixed gas in the diffusive mixture state in the diffusive mixing area and the burning velocity of the mixed gas in the premixture state in the premixing area, the latter is lower. Therefore, the average velocity of the mixed gas flowing in the gas flow passages 34 in the premixing area is made lower than that in the diffusive mixing area, by making the size of the ceramic balls 32 and the diameter of the second cylindrical portion 23 large while maintaining the condition that the average velocity of the mixed gas is higher than the burning velocity, whereby the pressure loss in this area is made small. As a result, an energy amount necessary for the gas to flow in the gas mixing device 2 can be small, compared with a case where the same ceramic balls 31 as those packed in the diffusive mixing area are packed in the whole gas mixing device 2 and the diameter of the second cylinder portion 23 is equal to that of the first cylindrical portion 21.

Further, the third cylindrical portion 24 corresponding to the discharge section of the gas mixing device 2 according to the embodiment is connected to the catalyst layer 15 whose temperature is higher than that in the gas mixing device 2, and therefore, the small ceramic balls 33 are packed in this third cylindrical portion 24 and the diameter of the third cylindrical portion 24 is small so that the mixed gas can flow at gas velocity higher than the burning velocity of the mixed gas which is heated up to the temperature of the inside of the catalyst layer 15. Therefore, for example, even if the mixed gas heated to high temperature flows back from the catalytic layer 15 to cause the combustion reaction (backfire), the progress of the reaction can be suppressed, so that the gas mixing device 2 can be operated safely.

Figure 8:
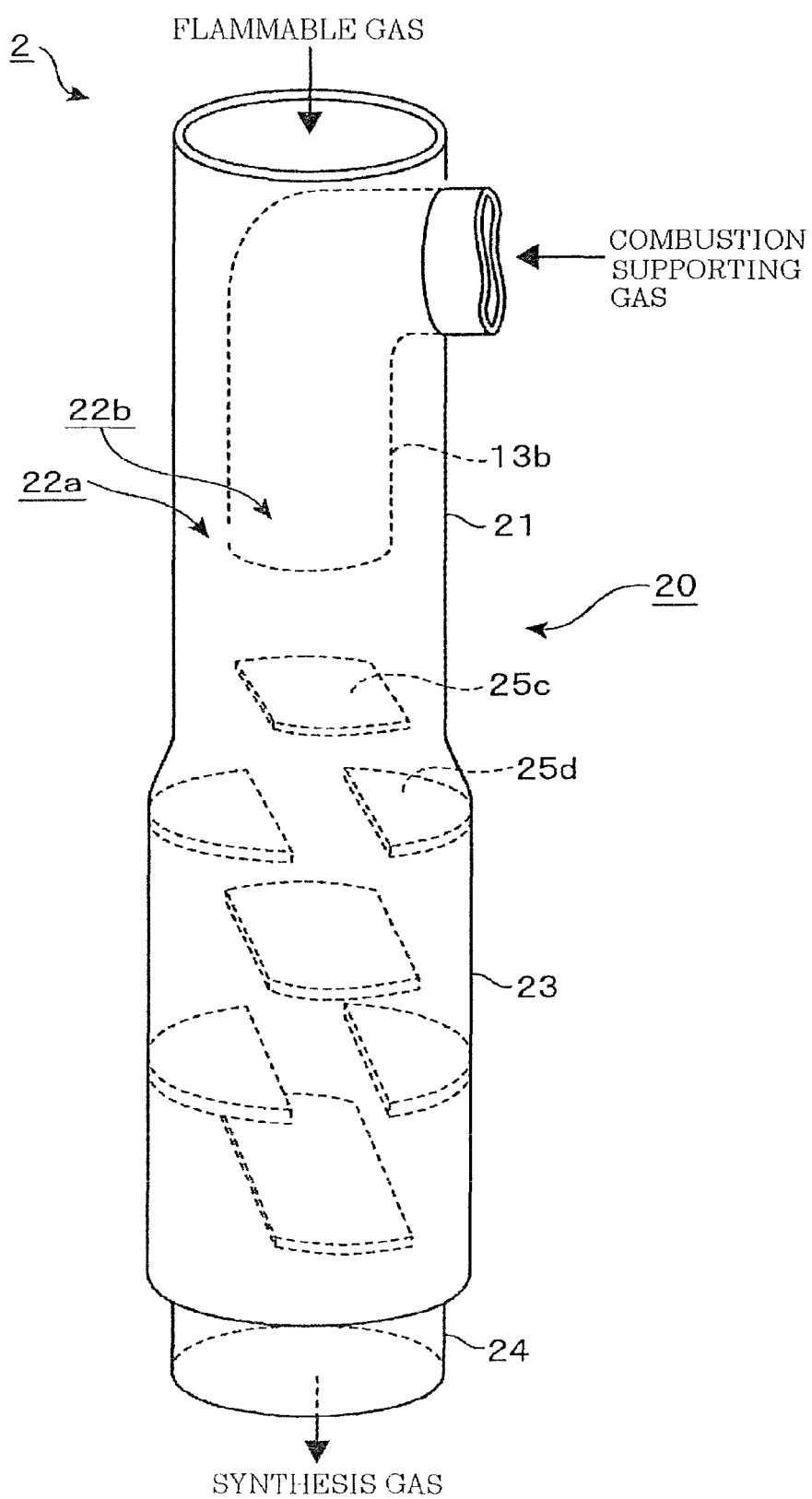
FIG. 8 is a perspective view showing a modification example of the gas mixing device.

Further, the gas mixing device 2 can eliminate uneven gas concentration to realize a more homogenous mixture state of the mixed gas since it includes the baffle members 25a, 25b which change, in a bulked manner, the flow direction of the mixed gas flowing in the diffusive mixing area and thus causes the repetition of the confluence and dispersion of the flow. It should be noted that the shape of the baffle members provided in the gas mixing device 2 is not limited to those shown in FIG. 3, but baffle members 25c 25d having cutouts in both sides and centers thereof respectively may be provided alternately as shown in FIG. 8, for instance, or those having other shape may be adopted.

Further, the packings packed in the gas mixing device 2 are not limited to the ceramic balls 31 to 33 shown in the embodiment, but for example, ceramic Raschig rings, bell saddles, or the like may be packed, or, for example, a structure having a crossflow honeycomb structure in which gas flow passages are formed vertically and laterally may be packed. Furthermore, the gas mixing device 2 according to this embodiment is applicable not only to the mixing operation, shown in the embodiment, of the flammable gas containing methane as its major component and the combustion supporting gas as oxygen-containing gas, but also to, for example, a gas mixing operation of propane and air, and so on.

What is claimed is:

1. A method of producing a gas mixing device comprising:

installing a first gas supplying section via which flammable gas is supplied;

installing a second gas supplying section separately from said first gas supplying section via which combustion supporting gas is supplied separately from the flammable gas;

installing a mixing vessel within which is mixed the flammable gas supplied via said first gas supplying section and the combustion supporting gas supplied via said second gas supplying section, within a combustion range of the gases;

installing a discharge section via which mixed gas of the flammable gas and the combustion supporting gas is discharged from said mixing vessel;

packing spherical packings which are packed in said mixing vessel and said discharge section and form there between a large number of narrow gas flow passages in said mixing vessel and said discharge section;

predetermining diameters of said spherical packings to define an average diameter of flow passages among said narrow gas flow passages formed between spherical packings;

wherein said predetermining comprises selecting diameters of said spherical packings to define an average diameter of flow passages among said narrow gas flow passages formed between spherical packings, as converted to a diameter of an equivalent circular tube;

wherein in a diffusive mixing area which is an area near the supply ports of said first gas supplying section and said second gas supplying section, said selecting diameters of said spherical packings to define said average diameter of flow passages is predetermined to achieve a velocity of gas flowing in said narrow gas flow passages of said diffusive mixing area, when a prescribed minimum flow volume of said flammable gas and said combustion supporting gas is supplied from said first gas supplying section and second gas supplying section, that is higher than the burning velocity of the flammable gas and the combustion supporting gas in the diffusive mixing area;

wherein in an area of the mixing vessel on a downstream side of the diffusive mixing area, said selecting diameters of said spherical packings to define said average diameter of flow passages is predetermined to achieve a velocity of gas flowing in said narrow gas flow passages of said downstream-side area that is higher than the burning velocity of the flammable gas and the combustion supporting gas in a homogeneous mixing state, when the prescribed minimum flow volume of said flammable gas and said combustion supporting gas is supplied from said first gas supplying section and said second gas supplying section;

wherein the diameters of said spherical packings packed in said mixing vessel in said downstream-side area are larger than the diameters of said spherical packings packed in said diffusive area;

wherein in said discharge section said selecting diameters of said spherical packings to define said average diameter of flow passages is predetermined to achieve a velocity of the mixed gas flowing in said narrow gas flow passages of said discharge section, when the prescribed minimum flow volume of said flammable gas and said combustion supporting gas is supplied from said first gas supplying section and second gas supplying section, that is higher than the burning velocity of said mixed gas at a process temperature of a downstream process where the mixed gas is processed; and wherein the diameters of said spherical packings packed in said mixing vessel in said downstream-side ara are larger than the diameters of said spherical packings packed in said discharge section.

2. The method for producing the gas mixing device according to claim 1, wherein said installing the second gas supplying section comprises installing the second gas supplying section via which oxygen-containing gas is supplied.

3. The method for producing the gas mixing device according to claim 2, wherein said installing the first gas supplying section comprises installing the first gas supplying section via which the flammable gas, which contains methane as a major component, is supplied.

4. The method for producing the gas mixing device according to claim 3, wherein the mixed gas is used to produce synthesis gas containing hydrogen and carbon monoxide as major components by partially oxidizing the methane by the oxygen in the presence of a catalyst.

5. The method for producing the gas mixing device according to claim 1, wherein said packing comprises filling said packings in the diffusive mixing area up to an upstream side of said first supplying section and said second supplying section, respectively.

6. The method for producing the as mixing device according to claim 1, wherein said packing spherical packings comprises packing ceramic balls.

7. The method for producing the gas mixing device according to claim 1, further comprising connecting said first gas supplying section and said second gas supplying section to said mixing vessel in a double tube state in which one of said gas supplying sections is an outer tube and the other is an inner tube.

8. The method for producing the gas mixing device according to claim 1, wherein said installing the mixing vessel comprises installing the mixing vessel having a baffle member promoting homogeneous mixture of the flammable gas and the combustion supporting gas.

9. The method for producing the gas mixing device according to claim 1, wherein said selecting the average diameter of flow passages is based on the following relation: $S_T = f(d, [O_2]/[CH4], T, P)$; where $S_T$ is the burning velocity, d is the average diameter, T is temperature, P is pressure, $O_2$ is oxygen and $CH_4$ is methane.

* * * * *